United States Patent
Bean

[19]

[11] Patent Number: 6,062,940
[45] Date of Patent: May 16, 2000

[54] DUAL DIAPHRAGM GAME CALL HAVING RUGGEDIZED DIAPHRAGM MOUNTINGS AND EFFICIENT METHOD OF MANUFACTURING THE SAME

[75] Inventor: Ron M. Bean, Cedar Rapids, Iowa

[73] Assignee: Hunter's Specialties, Inc., Cedar Rapids, Iowa

[21] Appl. No.: 09/110,496

[22] Filed: Jul. 6, 1998

[51] Int. Cl.[7] ................................................. A63H 5/00
[52] U.S. Cl. ........................ 446/193; 446/207; 446/209
[58] Field of Search ................................. 446/188, 193, 446/207, 209, 397

[56] References Cited

U.S. PATENT DOCUMENTS

| | | | |
|---|---|---|---|
| 4,048,750 | 9/1977 | Wolfe | 446/193 |
| 4,799,913 | 1/1989 | Wolfe | 446/193 |
| 4,950,198 | 8/1990 | Repko | 446/207 |
| 5,549,498 | 8/1996 | Kirby | 446/193 |
| 5,803,785 | 9/1998 | Primos et al. | 446/207 |
| 5,885,125 | 3/1999 | Primos | 446/207 |

FOREIGN PATENT DOCUMENTS

| 109191 | 9/1917 | United Kingdom | 446/209 |
|---|---|---|---|

*Primary Examiner*—John A. Ricci
*Attorney, Agent, or Firm*—Simmons, Perrine, Albright & Ellwood, PLC

[57] ABSTRACT

A dual diaphragm hand-held game call having a sound chamber therein with a diaphragm at each end wherein the diaphragms each include a latex diaphragm sandwiched between relatively rigid opposing plates with the opposing plates having sonic energy focussing teeth on at least one of the plates.

12 Claims, 1 Drawing Sheet

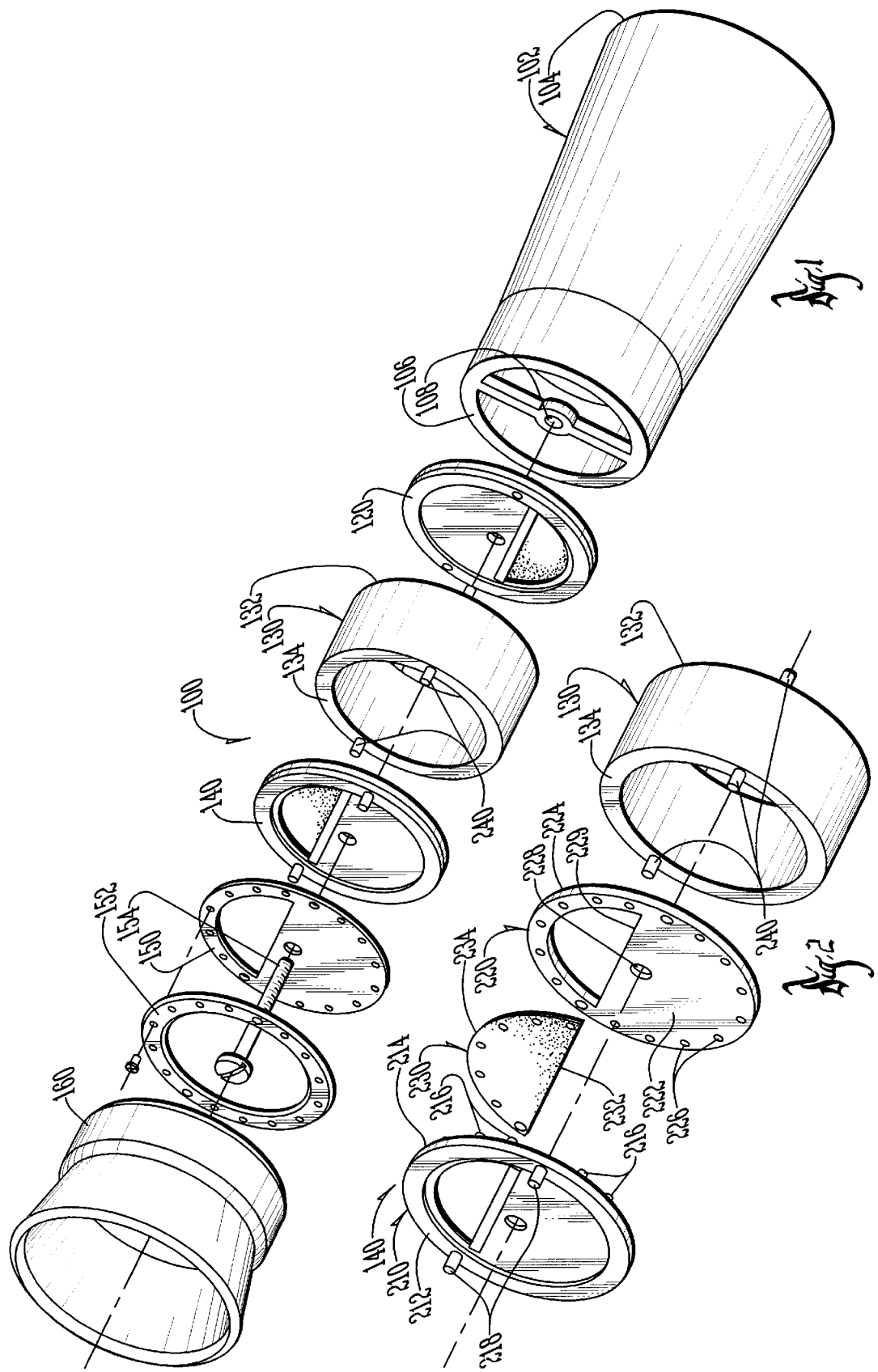

DUAL DIAPHRAGM GAME CALL HAVING RUGGEDIZED DIAPHRAGM MOUNTINGS AND EFFICIENT METHOD OF MANUFACTURING THE SAME

FIELD OF THE INVENTION

The present invention generally relates to game calls and more particularly relates to hand-operated dual diaphragm game calls, and even more particularly relates to durable and machine-manufacturable dual diaphragm hand-operated game calls.

BACKGROUND OF THE INVENTION

In the past, turkey hunters have extensively used turkey calls as described in U.S. Pat. No. 4,799,913 and U.S. Pat. No. 4,048,750, both issued to Gilbert H. Wolfe. While these calls have enjoyed considerable success in the past, they do have some drawbacks. For example, the game call similar to the U.S. Pat. No. 4,799,913 patent is known to exhibit some problems when the call is reassembled by a hunter who has disassembled it for cleaning, moisture removal or a general inspection. The makers of this call have used tape to secure a latex diaphragm to a sound chamber. This tape is prone to detachment from the sound chamber after repeated reassembly/disassembly operations. Additionally, the process of attaching the tape to the sound chamber is labor intensive and if it is not done correctly, can result in manufacturing yield problems or a requirement to rework the call during the manufacturing process.

Consequently, there exists a need for a hand-operated dual diaphragm game call which overcomes some of these problems.

SUMMARY OF THE INVENTION

It is an object of the present invention to provide a durable dual diaphragm game call.

It is a feature of the present invention to include a pair of latex diaphragms where each is sandwiched in a diaphragm holder having opposing plates which secure the diaphragm.

It is an advantage of the present invention to eliminate the need for taping a latex diaphragm to a sound chamber.

It is another advantage of the present invention to provide for a diaphragm holder which is readily manufacturable with reduced labor requirements associated with affixing the diaphragm to the sound chamber.

The present invention is an improved hand-held game call which includes dual diaphragms where each diaphragm is retained between a pair of opposing securing plates and a method of manufacturing the same, which is designed to satisfy the aforementioned needs, provide the previously stated objects, include the above-listed features, and achieve the already articulated advantages. In the present invention, the problems associated with taping a latex diaphragm to a sound chamber are greatly reduced.

Accordingly, the present invention is a dual diaphragm hand-held game call and method of manufacturing the same which includes a pair of diaphragms in which each diaphragm is positioned between a pair of opposing plates for securing the intermediate diaphragm.

BRIEF DESCRIPTION OF THE DRAWINGS

The invention may be more fully understood by reading the following description of the preferred embodiments of the invention, in conjunction with the appended drawings wherein:

FIG. 1 is an exploded perspective view of the game call of the present invention.

FIG. 2 is an enlarged exploded perspective view of one end of the sound chamber of the present invention, together with an exploded view of the diaphragm assembly.

DETAILED DESCRIPTION

Now referring to the drawings, wherein like numerals refer to like matter throughout, and more particularly to FIG. 1, there is shown an exploded view of the game call of the present invention generally designated 100, having a horn 102, having an outlet end 104 and an inlet end 106. Centrally disposed at inlet end 106 is a main screw receiving member 108. Coupled to horn 102 is a first diaphragm assembly 120 which couples with horn end 132 of sound chamber 130. Coupled to bellows end 134 of sound chamber 130 is second diaphragm assembly 140. Disposed outwardly from second diaphragm assembly 140 is ring 150 and bezel 152 which are coupled to diaphragm assembly 140 which is substantially similar to assembly 120. Main screw 154 is inserted through central holes in assemblies 140 and 120 and extends through sound chamber 130 and is ultimately received by main screw receiving member 108. A bellows 160 is coupled to the sound chamber 130 by extending the bellows 160 over the bellows end 134 of the sound chamber.

Now referring to FIG. 2, there is shown an enlarged exploded perspective view of a portion of the present invention shown in FIG. 1. Diaphragm assembly 140 is shown having three primary components, a retaining ring 210, a diaphragm plate 220, and a latex diaphragm 230. Ring 210 is shown having a top side 212, a bottom side 214, registering pins 218 and a plurality of energy focusing protuberances 216. Plate 220 is shown having a top side 222, a bottom side 224, a plurality of protuberance receiving voids 226 disposed along top side 222. Disposed centrally of top side 222 is diaphragm central region 228 having a central hole therein. Diaphragm central region 228 has an air passage therein and a diaphragm interfacing edge 229 along one side. Disposed between plate 220 and ring 210 is latex diaphragm 230, which has a curved edge 234 and a straight edge 232. Assembly 140 is mated with sound chamber 130 through registering pins 240. Assembly 140 may be any diaphragm assembly having a flexible diaphragm disposed between restraining plates or restraining rings. Numerous well known techniques could be employed to manufacture a sandwiched diaphragm, including, but not limited to techniques commonly used in manufacturing mouth diaphragm calls.

The call 100 of the present invention could be manufactured by first providing a diaphragm plate 220 having an air flow passage therethrough which has a straight side forming a diaphragm interfacing edge 229. Secondly a flexible diaphragm 230 is disposed on said plate 220. An opposing ring 210 disposed on said diaphragm and caused to be fused together using known techniques of sonic Welding, adhesives or any friction binding. Once the diaphragm assembly is completed, the remainder of the call 100 is assembled including the similar assembly process of the first diaphragm assembly 120.

It is thought that the apparatus and method of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described being merely a preferred or exemplary embodiment thereof.

I claim:

1. A game call comprising:
   a hollow handle having an air inlet end and an air outlet end and formed to function as a horn;
   a bellows having an exit end and a closed end;
   a sound chamber disposed between said handle and said bellows wherein said sound chamber has a horn end and a bellows end;
   a diaphragm disposed at said horn end and at said bellows end;
   said diaphragm disposed at said horn end including a diaphragm plate, a diaphragm retaining member and a flexible partially disk-shaped diaphragm disposed therebetween.

2. A call of claim 1 wherein said diaphragm is a latex material.

3. A call of claim 2 wherein said diaphragm plate and said diaphragm retaining member are coupled with sonic welding techniques.

4. A game call comprising:
   a hollow handle having an air inlet end and an air outlet end and formed to function as a horn;
   a bellows having an exit end and a closed end;
   a sound chamber disposed between said handle and said bellows wherein said sound chamber has a horn end and a bellows end;
   a diaphragm disposed at said horn end and at said bellows end;
   said diaphragm disposed at said horn end including a diaphragm plate, a diaphragm retaining member and a flexible diaphragm disposed therebetween; and
   said diaphragm retaining member has disposed thereon a plurality of protuberances.

5. A call of claim 4 wherein said diaphragm plate has a plurality of protuberance receiving voids therein.

6. A call of claim 5 wherein said protuberances have a predetermined shape to achieve a predetermined energy focusing characteristic when sonic welding processes are applied to said diaphragm plate and said diaphragm retaining member.

7. A game call comprising:
   a sound directing means having an air inlet end and an air outlet end;
   an air current producing means having an exit;
   an air passage means disposed between said sound directing means and said air current producing means;
   a first sound producing means disposed on said sound air passage means;
   said first sound producing means including a first vibrating means and a first pair of opposing restraining means;
   wherein said sound directing means is a megaphone;
   wherein said air current producing means is a bellows;
   a second sound producing means disposed on an opposite side of said air passage means from said first sound producing means;
   wherein said second sound producing means includes a second vibrating means and a second pair of opposing restraining means; and
   wherein said first pair of opposing restraining means and said second pair of opposing restraining means each contain a ring having protuberances thereon for engaging an opposing restraining ring.

8. A call of claim 7 wherein said protuberances focus sonic welding energy.

9. A call of claim 8 wherein said sound directing means is a tube having a larger diameter at said air outlet end with respect to said air inlet end.

10. A call of claim 9 wherein said air passage means has intergal thereto means for coupling with said first sound producing means.

11. A call of claim 10 wherein said means for coupling includes registering pins.

12. A call of claim 11 further including a bezel disposed between said air current producing means and said first sound producing means.

* * * * *